UNITED STATES PATENT OFFICE.

OTTO C. GRIEM, OF DETROIT, MICHIGAN, ASSIGNOR TO BERRY BROTHERS, OF DETROIT, MICHIGAN, A CORPORATION OF MICHIGAN.

PROCESS OF MELTING VARNISH-GUMS.

1,265,326.

Specification of Letters Patent. Patented May 7, 1918.

No Drawing. Application filed November 17, 1917. Serial No. 202,553.

*To all whom it may concern:*

Be it known that I, OTTO C. GRIEM, a citizen of the United States of America, residing at Detroit, in the county of Wayne and State of Michigan, have invented certain new and useful Improvements in Processes of Melting Varnish-Gums, of which the following is a specification.

The invention relates to the manufacture of varnish and it is the object of the invention, first, to avoid discoloration of the gum in melting; and second, to facilitate the melting and to shorten the time required for the same.

In the present state of the art it is usual to place the various gums, resins and similar vegetable secretions from which the varnish is made in melting kettles, in which they are subjected to a temperature ranging from 220° to 650° F. It has been found that during this melting the gums are frequently discolored to a greater or less extent, which is detrimental. I have discovered that by parboiling the gums in water and then pouring off the water and melting, discoloration is prevented and the whole process can be carried out in less time.

The reason for this improved result is not fully understood but may possibly be accounted for, first, by the elimination from the gum during the parboiling of certain ingredients which would cause discoloration if raised to a high temperature. Another possible explanation is the fact that the gum, which originally is in chunks, will when placed in the kettle be in contact with air in the spaces between the particles. Thus the particles which are at the bottom of the kettle and are first melted will be in contact with air at relatively high temperature, causing oxidation or other chemical change, producing discoloration. When, however, the gum is first heated while covered with water or other medium for excluding the air the particles will be plastic and will flow together so as to exclude the air after the water is poured off. Whatever the action may be, the effect produced is to melt the gum more readily and without objectionable discoloration.

In the specific application of my process the gums are first covered with water and parboiled for approximately one-half hour. The water is then poured off and the melting is effected in approximately $2\frac{1}{4}$ to $2\frac{1}{2}$ hours, the temperature ranging from 220° to 600° or 650° F.

What I claim as my invention is:

1. The process of melting gums, comprising the protecting of the particles from air contact and while so protected fusing the same together.

2. The process of melting gums, comprising the filling of the spaces between the particles of gum with a medium for excluding air, fusing the particles together and continuing the heat treatment until completely melted.

3. The process of melting gums, comprising the covering of the gum with a non-solvent liquid, heating until the particles are fused together, pouring off the liquid and continuing the heating until completely melted.

4. The process of melting gums, comprising the covering of the particles with water, boiling until the particles are softened and flow together, pouring off the water and continuing to heat until completely melted.

In testimony whereof I affix my signature.

OTTO C. GRIEM.